US011855837B2

(12) United States Patent
Bharde et al.

(10) Patent No.: US 11,855,837 B2
(45) Date of Patent: *Dec. 26, 2023

(54) ADAPTIVE TIME WINDOW-BASED LOG MESSAGE DEDUPLICATION

(71) Applicant: Hewlett Packard Enterprise Development LP, Spring, TX (US)

(72) Inventors: Madhumita Bharde, Andover, MA (US); Rohini Raghuwanshi, Karnataka (IN); Prathima Mary Sibbala, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,189

(22) Filed: Feb. 24, 2023

(65) Prior Publication Data
US 2023/0224209 A1 Jul. 13, 2023

Related U.S. Application Data

(63) Continuation of application No. 17/301,953, filed on Apr. 20, 2021, now Pat. No. 11,595,249.

(30) Foreign Application Priority Data

Jun. 30, 2020 (IN) .............................. 202041027886

(51) Int. Cl.
*H04L 41/0686* (2022.01)
*H04L 41/0604* (2022.01)
*H04L 41/069* (2022.01)

(52) U.S. Cl.
CPC ........ *H04L 41/0686* (2013.01); *H04L 41/069* (2013.01); *H04L 41/0609* (2013.01)

(58) Field of Classification Search
CPC ............ H04L 41/0686; H04L 41/0609; H04L 41/069

(Continued)

(56) References Cited

U.S. PATENT DOCUMENTS 8,250,325 B2 8/2012 Holdman et al.
8,407,335 B1 * 3/2013 Church ............... G06F 11/0709
709/224

(Continued)

FOREIGN PATENT DOCUMENTS

| CN | 101888309 A | 11/2010 |
|----|-------------|---------|
| CN | 106294351 A | 1/2017 |
| CN | 110399347 A | 11/2019 |

OTHER PUBLICATIONS

Amazon Web Services, Inc., "Using the Amazon SQS Message Deduplication ID", 2 pages, Fabruary 20, 2020, retrieved from https://web.archive.org/web/20200220024023if_/https://docs.aws.amazon.com/AWSSimpleQueueService/lalest/SQSDeveloperGuide/using-messagededuplicationid-properly.html.

(Continued)

*Primary Examiner* — Tauqir Hussain
(74) *Attorney, Agent, or Firm* — Trop, Pruner & Hu, P.C.

(57) ABSTRACT

Example techniques for adaptive time window-based log message deduplication are described. In an example, message values are obtained from received log messages. Further, the number of log messages received in a time window having a message value is counted. A log message from which the message value is obtained and the counted number are transmitted upon expiry of the time window. A length of a time window in which a subsequent counting of log messages is to be performed is determined based on various parameters.

20 Claims, 11 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 9,106,681 | B2* | 8/2015 | Singla | H04L 63/1441 |
| 9,489,135 | B2 | 11/2016 | Dukes et al. | |
| 11,023,896 | B2* | 6/2021 | Zhou | G06N 3/047 |
| 11,144,506 | B2* | 10/2021 | Natanzon | H03M 7/607 |
| 11,151,089 | B2* | 10/2021 | Savir | G06N 20/00 |
| 11,392,582 | B2* | 7/2022 | Saurabh | G06F 16/2425 |
| 11,465,294 | B2* | 10/2022 | Chae | G06N 20/00 |
| 11,595,249 | B2* | 2/2023 | Bharde | H04L 41/0686 |
| 2005/0086502 | A1* | 4/2005 | Rayes | H04L 63/20 |
| | | | | 713/189 |
| 2011/0296237 | A1* | 12/2011 | Mandagere | G06F 11/079 |
| | | | | 714/E11.029 |
| 2013/0024722 | A1* | 1/2013 | Kotagiri | G06F 3/0619 |
| | | | | 714/6.1 |
| 2016/0085452 | A1 | 3/2016 | Dukes et al. | |
| 2016/0085792 | A1* | 3/2016 | Dukes | G06F 3/0608 |
| | | | | 707/692 |
| 2017/0063762 | A1* | 3/2017 | Machol | H04L 51/56 |
| 2018/0219723 | A1* | 8/2018 | Scarpelli | G06F 21/552 |
| 2019/0173942 | A1 | 6/2019 | Leighton et al. | |
| 2019/0340048 | A1* | 11/2019 | Brown | G06F 11/0724 |
| 2019/0379393 | A1 | 12/2019 | Wu | |
| 2020/0311029 | A1* | 10/2020 | Demoor | G06F 3/0604 |
| 2020/0336495 | A1* | 10/2020 | Tada | H04L 43/16 |
| 2021/0042270 | A1 | 2/2021 | Shi et al. | |
| 2022/0197879 | A1* | 6/2022 | Jha | G06F 16/217 |
| 2023/0128244 | A1* | 4/2023 | Jha | G06F 16/3334 |
| | | | | 704/9 |

OTHER PUBLICATIONS

Cafasso, M., et al., RabbitMQ Message Deduplication Plugin, 4 pages, May 26, 2020,0 available at https://github.com/noxdatox/rabbitmq-message-deduplication/tree/52572b9705f2f0f07f6d6af4b23e9c9b3fea611d.

Shah, A. S., et al.; "The Improvised Gzip, a Technique for Real Time Lossless Data Compression"; Jun. 26, 2019; pp. 1-8; EAI, vol. 6, Issue 17.

Shareb, A. A., "Delivering billions of messages exactly once", Segment Biog, 20 pages, Jun. 29, 2017, available at https://segment.com/blog/exactly-once-delivery/.

Unknown, "Beetle: High Availability AMQP Messaging With Redundant Queues", 2 pages, Jun. 16, 2016, retrieved from https://web.archive.org/web/20160616201400/http://xing.github.io/beetle/.

Veritas, "Netbackup MSDP Leg Files," Veritas NetBackupTM Deduplication Guide, Feb. 18, 2020, pp. 1-6,Retrieved from the Internet on Mar. 20, 2020 at URL: <veritas.com/content/support/en_US/doc/25074086-136046435-0/v95643184-136046435>.

\* cited by examiner

| DICTIONARY 212 ||
| --- | --- |
| MESSAGE VALUE | COUNT |
| FIRST MESSAGE VALUE | 1 |
| SECOND MESSAGE VALUE | 5 |

Fig. 3(a)

| DICTIONARY 212 |||
| --- | --- | --- |
| MESSAGE VALUE 1 | MESSAGE VALUE 2 | COUNT |
| FIRST MESSAGE VALUE | THIRD MESSAGE VALUE | 1 |
| FIRST MESSAGE VALUE | FOURTH MESSAGE VALUE | 4 |
| SECOND MESSAGE VALUE | FIFTH MESSAGE VALUE | 5 |
| SECOND MESSAGE VALUE | SIXTH MESSAGE VALUE | 7 |

Fig. 3(b)

| DICTIONARY 212 |||||||
| --- | --- | --- | --- | --- | --- | --- |
| MESSAGE VALUE | COUNT | MIT | LST | WINDOW LENGTH | DICTIONARY TYPE | MV TYPE |
| FIRST MESSAGE VALUE | 8 | 53 | 2019-04-06: 12:49.005 | 600 | NON-NESTED | HASH |
| SECOND MESSAGE VALUE | 5 | 78 | 2019-04-06: 12:46.045 | | | |

Fig. 3(c)

ADAPTIVE TIME WINDOW-BASED LOG MESSAGE DEDUPLICATION

CROSS-REFERENCE TO RELATED APPLICATIONS

This application is a continuation application of and claims priority to U.S. patent application Ser. No. 17/301,953 filed on Apr. 20, 2021, which claims priority to Indian Patent Application No. 202041027886 filed Jun. 30, 2020, the contents of which are hereby incorporated by reference in their entireties.

BACKGROUND

Log messages may be generated by a computing device to provide information regarding operation of the computing device, such as a fault in a component of the computing device or a result of a scanning operation in the computing device. The log messages may be transmitted to a backend computing device, also referred to as a backend device, for processing and for taking remedial actions.

BRIEF DESCRIPTION OF DRAWINGS

The following detailed description references the figures, wherein:

FIG. 3(a) illustrates a dictionary, according to an example implementation of the present subject matter.

FIG. 3(b) illustrates a dictionary, according to an example implementation of the present subject matter.

FIG. 3(c) illustrates a dictionary, according to an example implementation of the present subject matter.

DETAILED DESCRIPTION

Figure 1:
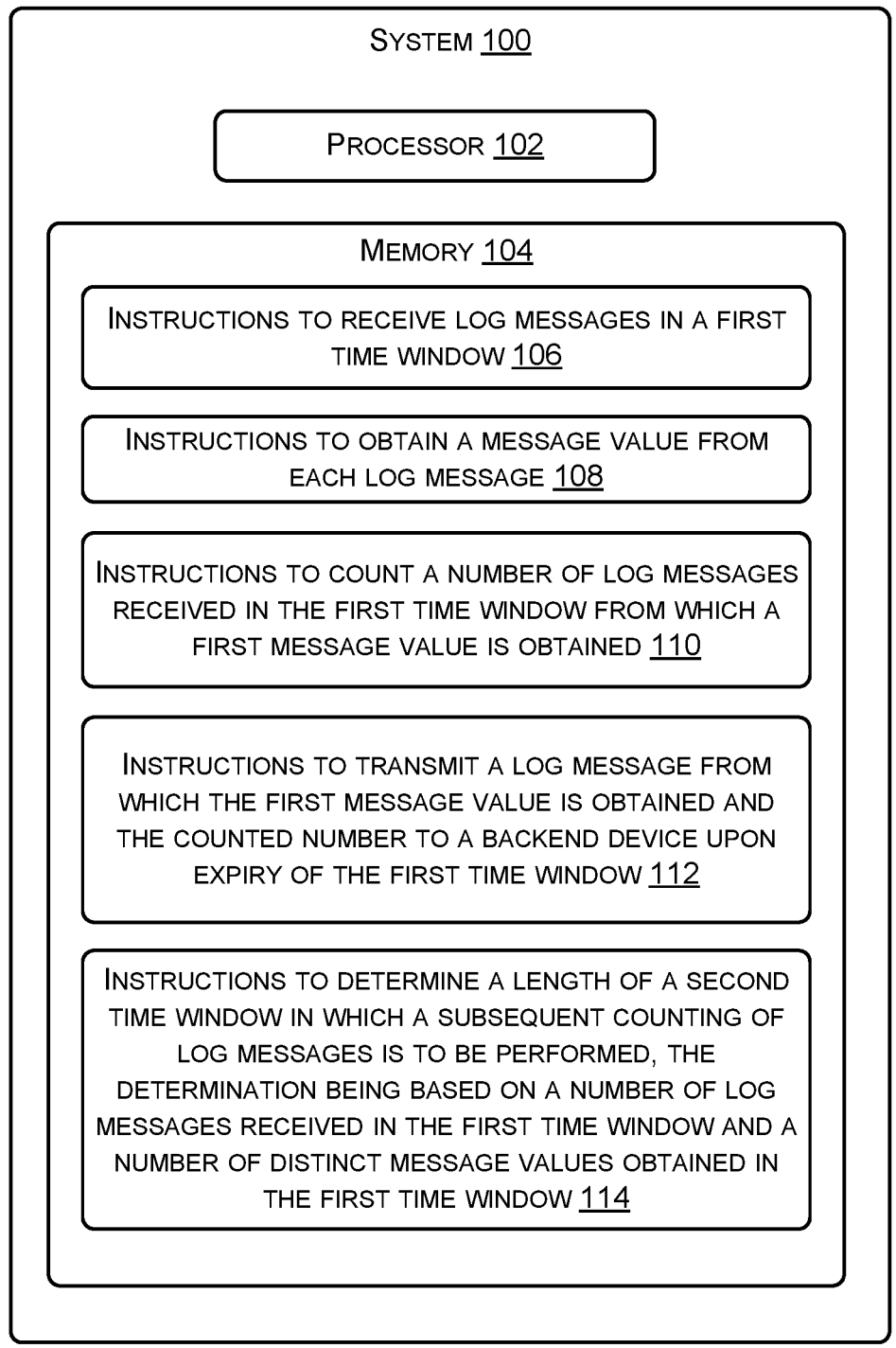
FIG. 1 illustrates a system for performing adaptive time window-based deduplication of log messages, according to an example implementation of the present subject matter.

Log messages generated at a computing device may be sent to a backend device for further processing. Several of the log messages may be redundant or repeated over time, for example, when the same operating state of the computing device occurs at different times. The processing of redundant log messages wastes computational resources of the backend device and may also delay the processing of unique log messages. Additionally, sometimes, the log messages may be generated at a high rate in the computing device, for example, due to a fault in a component or due to loss of network connectivity. The arrival of log messages at high rates at the backend device may overwhelm the backend device, causing a further delay in processing of the log messages.

Further, in some cases, the log messages are to be transformed by the computing device to make them processable by the backend device. Therefore, if log messages are generated at a high rate, several rounds of transformation are to be performed in a short period of time, causing a high amount of resource consumption at the computing device. Such resource consumption is wasteful in case of redundant log messages.

To prevent transmission of redundant log messages to the backend device, deduplication techniques are generally utilized, which involve dropping redundant messages received in a particular duration. However, such techniques may not be effective in a flood scenario (in which log messages are generated very frequently) of a random duration or in an idle scenario.

The present subject matter relates to adaptive time window-based deduplication of log messages. The present subject matter prevents the transmission of redundant messages to the backend device even in flood scenarios.

In accordance with an example implementation, message values are obtained from incoming log messages. A message value may be the whole or a part of the log message or may be derived from the whole or a part of the log message. In an example, the message value obtained from redundant log messages may be identical. Further, the number of incoming log messages with a particular message value may be counted. To perform the counting, a dictionary storing a plurality of message values and a count associated with each message value may be utilized. Subsequently, a log message from which a message value is obtained, and a count associated with the message value may be transmitted to a backend device.

Since a single log message is transmitted corresponding to several redundant log messages, the number of redundant messages received by the backend device reduces. Further, each log message may not be transformed for being processed by the backend device. Therefore, the resources expended in transformation of log messages may be reduced. The transmission of the single log message corresponding to multiple redundant log messages results in deduplication.

The counting may be performed in a first time window. Further, the transmission of the log message and the count may be performed upon expiry of the first time window. The counting may then be restarted in a second time window. In an example, in addition to the log message and the count, metrics indicating temporal distribution of incoming log messages may also be transmitted to the backend device. The metrics may include, for example, a length (i.e., duration) of the first time window, last timestamp within the first time window at which a log message corresponding to the first message value was received, mean inter-arrival time of log messages corresponding to the first message value, and a histogram indicating the temporal distribution. The metrics may facilitate the backend device to deduce an underlying cause of generation of the log messages and to take a corrective action. Thus, the transmission of the metrics prevents loss of information due to the deduplication.

In an example implementation, a length (i.e., duration) of the second time window may be determined based on the number of log messages received in the first time window and the number of distinct message values obtained in the first time window. For instance, the length of the second time window may be set to a greater length than that of the first time window if a ratio of the number of log messages to the number of distinct message values is less than a threshold. This is because a small value of the ratio indicates that more log messages are transmitted to the backend device and an increase in the length of the time window may reduce the number of log messages transmitted. Thus, the computation of the length of the second time window in this manner controls the number of log messages transmitted to the backend device.

In an example, the length of the second time window may be computed based on a first rate at which log messages were received in the first time window and a second rate at which log messages were received in a zeroth time window before the first time window. The first rate and the second rate can indicate the presence of a flood scenario and therefore, the setting of the length of the second time window based on the rates prevents transmission of a large number of redundant messages.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

FIG. 1 illustrates a system 100 for performing adaptive time window-based deduplication of log messages, according to an example implementation of the present subject matter. The system 100 may be implemented as a computing device, such as a desktop computer, a laptop computer, a server, or the like. The system 100 includes a processor 102 and a memory 104 coupled to the processor 102. The processor 102 may also be referred to as a hardware processor 102.

The processor 102 may be implemented as a microprocessor, a microcomputer, a microcontroller, a digital signal processor, a central processing unit, a state machine, a logic circuitry, and/or any device that can manipulate signals based on operational instructions. Among other capabilities, the processor 102 may fetch and execute computer-readable instructions included in the memory 104. The computer-readable instructions include instructions 106, instructions 108, instructions 110, instructions 112, and instructions 114. The functions of the processor 102 may be provided through the use of dedicated hardware as well as hardware capable of executing machine readable instructions.

The memory 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

In addition to the processor 102 and the memory 104, the system 100 may also include interface(s) and system data (not shown in FIG. 1). The interface(s) may include a variety of instructions-based interfaces and hardware interfaces that allow interaction with a user and with other communication and computing devices, such as network entities, web servers, external repositories, and peripheral devices. The system data may serve as a repository for storing data that may be fetched, processed, received, or created by the instructions.

In operation, the system 100 may transmit log messages and counts to a backend device (not shown in FIG. 1) by executing the instructions 106-114. The processor 102 may receive log messages in a first time window. The log messages may be generated by a source device, which may be the system 100 or a device connected to the system 100. The log messages may include messages generated by the source device and may provide information about the working of the source device. For instance, the log messages may indicate the installation of a new component in the source device or that the working temperature of a component of the source device is high. The receipt of the log messages may be performed by executing the instructions 106.

The processor 102 may obtain a message value from each log message. The message value may be, for example, the whole of the log message, the whole of the log message except a particular portion of the log message, a particular portion of the log message, a value derived from the whole or part of the log message, or any combination thereof. In an example, similar log messages may have the same message value. The message value may be obtained by executing the instructions 108.

The processor 102 may count a number of log messages received in the first time window from which a first message value is obtained. A log message from which the first message value is obtained may be referred to as a log message corresponding to the first message value. Upon expiry of the first time window, a log message corresponding to the first message value is transmitted to a backend device. Further, the count of log messages may also be transmitted. Thus, a single log message may be transmitted corresponding to several log messages corresponding to the first message value. In an example, upon expiry of the first time window, more than one log message may be transmitted corresponding to the several log messages. However, the number of log messages transmitted may be less than that received. For discussion purposes, in the explanation provided below, a single log message is explained as being transmitted upon expiry of the first time window.

The transmission of a log message corresponding to several log messages results in deduplication. The counting may be performed by the processor 102 executing the instructions 110. Further, the transmission to the backend device may be performed by executing the instructions 112.

In an example, in addition to the log message and the count, metrics indicating temporal distribution of incoming log messages may also be transmitted to the backend device. The metrics may include, for example, a length of the first time window, last timestamp within the first time window at which a log message corresponding to the first message value was received, mean inter-arrival time of log messages corresponding to the first message value, and a histogram indicating the temporal distribution. The log message, the count, and the metrics may be collectively referred to as a marker message.

Upon expiry of the first time window, the counting of log messages may be restarted and performed in a second time window. The processor 102 may determine a length of the second time window based on a number of log messages received in the first time window and a number of distinct message values obtained in the first time window. The number of distinct message values received in the first time window may be less than the number of log messages received in the first time window, as a particular message value may be obtained from multiple log messages. For instance, consider that 20 log messages were received during the first time window, and that the first message value was obtained from ten of those messages and a second message value was obtained from the remaining ten messages. Accordingly, the number of distinct message values obtained in the first time window is two.

In an example, in addition to the number of log messages and the number of distinct message values, other parameters may be used to determine the length of the second time window. Since the lengths of the time windows are adapted based on various parameters, the time windows may be referred to as adaptive time windows. Further, the deduplication performed may be referred to as adaptive time window-based deduplication. Various example aspects of adaptive time window-based deduplication will be explained in greater detail below.

Figure 2:
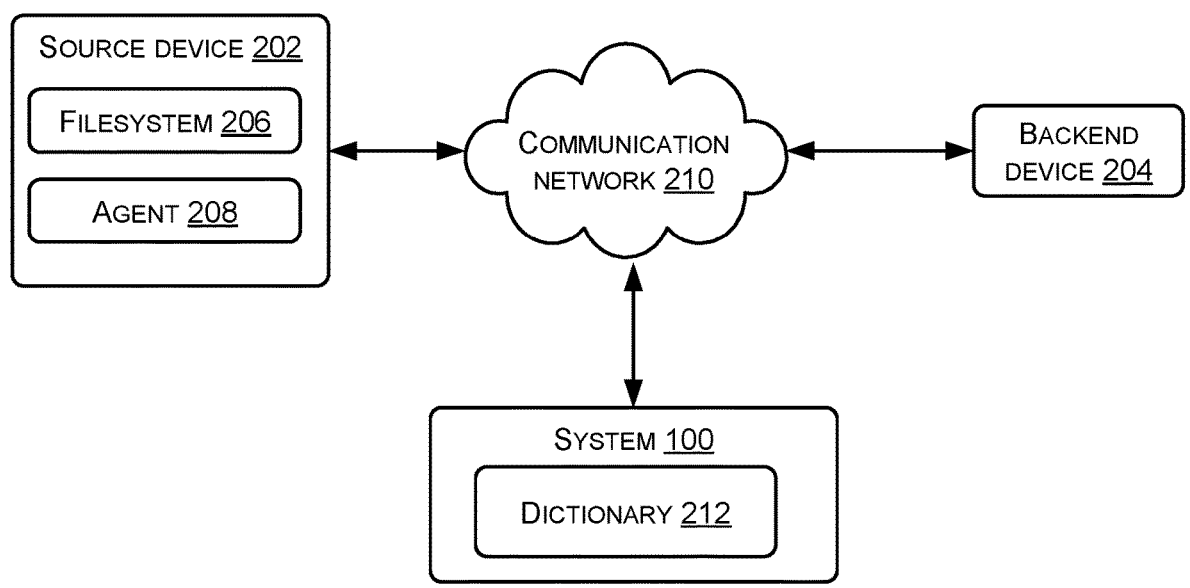
FIG. 2 illustrates a network environment having a system for performing adaptive time window-based deduplication of log messages, according to an example implementation of the present subject matter.

FIG. 2 illustrates a network environment having the system 100 for performing adaptive time window-based deduplication of log messages, according to an example implementation of the present subject matter. The system 100 may be connected to a source device 202 and a backend device 204. The source device 202 may generate log messages during its operation. In an example, the source device 202 may be a hyperconverged infrastructure system, in which compute, storage, and networking are integrated. The log messages generated by the source device 202 may include alerts generated by a filesystem 206 of the source device 202, a kernel, and/or user space (not shown in FIG. 2). The log messages may be transmitted by an agent 208 running on the source device 202, for processing by the backend device 204. The agent 208 may be, for example, a remote device access (RDA) agent.

In an example, the backend device 204 may be part of a cloud network that is to monitor the operation of the source device 202 and take corrective actions. For instance, the source device 202 may be installed on a remote site, such as an offshore drilling rig, and the backend device 204 may be part of a cloud network that is to manage performance of devices that are installed on remote sites.

The system 100 may receive log messages from the source device 202, deduplicate the log messages, and transmit a subset of the received log messages to the backend device 204. In an example, a log message may be sent as part of a marker message, which also includes a count and metrics indicating temporal distribution of log messages. In an example, the system 100 may be an intermediate server between source devices and the backend device 204. In an example, the intermediate server may serve as a master controller for connections to the backend device 204.

Although the system 100 is shown as distinct from the source device 202, in an example, the system 100 may be same as the source device 202. In such an example, both the generation and transmission of log messages may be performed by the system 100. To transmit log messages, a deduplication component (not shown in FIG. 2) of the system 100 may intercept log messages generated by a log generating component, such as the filesystem 206, kernel, or user space, of the system 100, and perform the deduplication. In addition, marker messages may be generated using log messages, counts, and metrics indicating temporal distribution of log messages. In an example, a marker message may be generated in a format readable by the backend device 204, such as a JavaScript Object Notation (JSON) format. The marker messages may then be transmitted to the agent 208, for transmission to the backend device 204. If the marker messages are transmitted by the source device 202, the number of messages transmitted to the intermediate server may reduce, thereby causing a further reduction of consumption of network resources. For discussion purposes, the source device 202 is considered as being distinct from the system 100.

The system 100 may communicate with the source device 202 and the backend device 204 over a communication network 210. The communication network 210 may be a wireless or a wired network, or a combination thereof. The communication network 210 may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network 210 may include various network entities, such as transceivers, gateways, and routers.

In some cases, the source device 202 may generate a large number of log messages. Further, several log messages may be repetitive, and therefore, redundant. To prevent overwhelming the backend device 204 with all the log messages generated by the source device 202, the system 100 may receive the log messages and identify the redundant messages.

In an example, upon receiving a log message, the system 100 may obtain a message value from the log message. A message value obtained from a log message may be referred to as a message value corresponding to the log message or a message value from the log message. Further, a log message from which a message value is obtained may be referred to as the log message having the message value. The message value may be, for example, an identifier of the log message, the whole of the log message, the whole of the log message except a timestamp in the log message (which may indicate a time of generation of the log message), a hash of the log message or of a part thereof, parts of the log message other than the unique identifiers in the log message, or any combinations thereof. A hash of the log message may be obtained by subjecting the log message to a hash function. The unique identifiers may be, for example, any globally unique identifiers (GUIDs) or universally unique identifiers (UUID) in the log message. By not considering the unique identifiers for obtaining the message value, log messages that are substantially similar to each other, but differing in details that are not useful in identifying an underlying error, may be identified as being similar to each other. The message value to be used may be selected, for example, based on resources expended for generating the message values and for comparing the message values. In an example, the message value may be compared with message values in a dictionary 212, which may be stored on the system 100.

FIG. 3(a) illustrates the dictionary 212, according to an example implementation of the present subject matter. The dictionary 212 may include a plurality of message values, such as a first message value and a second message value.

The dictionary 212 may be populated with message values that are obtained from the incoming log messages. For instance, the dictionary 212 may be populated with hash values of incoming log messages. Further, the dictionary 212 may have a single copy of a particular message value. Thus, each message value in the dictionary 212 may be distinct from other message values in the dictionary. In an example, the dictionary 212 may be populated with a message value obtained from a log message if the message value is absent in the dictionary 212. For instance, if a message value obtained from a log message is the second message value and if, based on a comparison of the second message value with the message values in the dictionary 212, it is determined that the second message value is absent in the dictionary 212, the second message value may be added to the dictionary 212. Populating of the dictionary 212 in this manner ensures that the dictionary 212 can keep a record of the message values being received in the incoming log messages. In an example, if the message value is a log message except the unique identifiers in the log message, the message values stored in the dictionary 212 may be a regular expression (regex) version of the log message, which can mask the unique identifiers.

The dictionary 212 may also store a count of a number of log messages received from which a particular message value is obtained. For instance, the dictionary 212 may store a count of the number of log messages from which the first message value is obtained, the number of messages from which the second message value is obtained, and so on. The number of messages from which a given message value is obtained may be referred to as a count associated with the message value. For instance, the count associated with the first message value may be five if five log messages are received from which the first message value is obtained. In an example, the dictionary 212 may include a table in which a count associated with a message value is indicated against the message value.

The count associated with a message value may be incremented by one for every incoming log message from which the message value is obtained. For instance, upon receiving a log message, the message value is obtained and compared with message values stored in the dictionary. If the obtained message value matches with a particular message value, the count associated with the message value is incremented by one. If the obtained message value does not match with any message value in the dictionary 212, the obtained message value is added to the dictionary 212 and the count associated with the message value is set to one. The comparison of message values and incrementing the count associated with message values in the dictionary 212 may be referred to as counting the number of log messages corresponding to a message value.

In an example, the counting of the number of log messages corresponding to a message value may be carried out in a particular time window. Upon expiry of the time window, the count associated with the message value, and one of the log messages having the message value and received during the particular time window may be transmitted to the backend device 204. To facilitate transmission of the log message upon expiry of the time window, in an example, the log message may also be stored in the dictionary 212. Further, the count associated with each message value may be reset in the dictionary 212. Subsequently, the counting of the number of log messages corresponding to message values may be restarted in a subsequent time window. Such a dictionary 212, where the message values are retained but counts are reset upon expiry of the time window, may be referred to as a static dictionary. If the dictionary 212 is a static dictionary, the dictionary 212 may be pre-loaded during boot or initialization of the system 100 with a list of message values typically observed.

In an example, instead of resetting the counts associated with message values, the message values and counts may be evicted from the dictionary 212, thereby purging the dictionary 212. Thereafter, in the subsequent time window, the dictionary 212 may be populated afresh with message values and counting may be performed in the manner explained above. The purging of the dictionary 212 upon expiry of a time window helps to remove the message values obtained from previous windows and reduce the size of the dictionary 212. In this case, the dictionary 212 may be referred to as a dynamic dictionary.

FIG. 3(*b*) illustrates the dictionary 212, according to an example implementation of the present subject matter. The dictionary 212 may be a nested dictionary, in which message values are arranged in a hierarchical fashion. Accordingly, more than one message value may be nested in another message value. For instance, a third message value and a fourth message value may be nested in the first message value and a fifth message value and a sixth message value may be nested in the second message value, as illustrated.

A nesting message value in the dictionary 212 may be a part of or may be derived from a part of an incoming log message, and a nested message value may be another part of or may be derived from another part of the incoming log message. Further, a nesting message value may have a plurality of corresponding nested message values. For instance, a log message having a particular nesting message value may have one of a plurality of nested message values corresponding to that nesting message value. As an example, a nesting message value may be a log generating component, such as a hardware component or a service, of the source device 202 and a corresponding nested message value may be a body of the log message generated by or concerning the component or the body of the log message except the unique identifiers in the body.

When the dictionary 212 is a nested dictionary, the comparison of the message values obtained from the log messages with the dictionary 212 may happen in multiple steps, where the number of steps equal the number of layers in the dictionary 212. For example, consider that the dictionary 212 has two layers, the first layer having the first message value and the second message value, and the second layer having the third through the sixth message values, as illustrated. Accordingly, two message values may be obtained from an incoming log message. For instance, a part of the log message or a value derived therefrom may be one message value, and another part of the log message or a value derived therefrom may be the other message value. One of the message values may be compared with the nesting message values in the dictionary 212, such as the first message value and the second message value. If the message value matches with one of the nesting message values, such as the first message value, the other message value from the log message may be compared with the nested message values, such as the third message value and the fourth message value, of that nesting message value. If the other message value matches with a nested message value, a count associated with the combination of the nesting message value and the nested message value, such as a combination of the first message value and the third message value, may be incremented.

The nesting of the dictionary 212 and the comparison in steps as explained above reduces the number of comparisons performed. For example, consider that the message values are arranged in the form of a list in the dictionary 212. Accordingly, several message bodies generated by a first component and several message bodies generated by a second component are listed in the dictionary 212. Therefore, if a log message generated by the second component arrives, the message value from the log message may be compared with multiple message values listed in the dictionary 212, including those generated by the first component. If, on the other hand, the dictionary 212 is a nested dictionary, the component and the body specified in the log message may be obtained as separate message values. Further, the component specified in the log message may be first compared with the first layer of message values in the dictionary 212. Once the component specified in the log message matches with the second component mentioned in the dictionary 212, the body specified in the log message is then compared with bodies nested in the second component.

FIG. 3(c) illustrates the dictionary 212, according to an example implementation of the present subject matter. The dictionary 212 may include additional information regarding log messages having a message value. The additional information may include metrics indicating a temporal distribution of incoming log messages corresponding to the message value in the first time window. The metrics may include, for example, the length of a time window, a last-seen timestamp (LST) within the time window in which a log message corresponding to a message value was received, and a mean inter-arrival time (MIT) between log messages corresponding to the message value. Similar to the count, the other values stored in the dictionary 212 may also get updated based on incoming log messages. For instance, the LST value corresponding to the first message value may get updated upon arrival of a log message having the first message value.

The dictionary 212 may also include a specification as to whether the dictionary is a nested dictionary. Further, the dictionary 212 may include a specification of a type of the message value (MV), i.e., whether the message value is the whole of the log message, the whole of the log message except a timestamp in the log message, a hash of the log message or of a part thereof, parts of the log message other than the unique identifiers in the log message, or the like.

The information stored on the dictionary 212 may be transmitted as part of the marker message and may be utilized by the backend device 204 to determine an underlying cause of generation of the log messages and to take a corrective action.

In an example, the system 100 may determine a length of a subsequent time window in which a subsequent deduplication is to be carried out based on a deduplication ratio, a number of distinct message values received in a previous time window, a rate at which log messages are received, or any combination thereof. Further, in an example, the message values and other entries in the dictionary 212 may be selectively evicted based on a last seen timestamp at which a log message having the message value was received. Still further, in an example, the system 100 may prioritize log messages based on an attribute of the log messages and may handle log messages of different priorities independent of each other. These aspects are explained with the help of flowcharts below.

FIGS. 4-10 illustrate methods 400-1000 respectively performed for adaptive time window-based deduplication of log messages, according to example implementations of the present subject matter. The order in which the methods 400-1000 is described is not intended to be construed as a limitation, and any number of the described method blocks may be combined in any order to implement the methods 400-1000, or alternative methods. Furthermore, the methods 400-1000 may be implemented by processing resource(s) or computing device(s) through any suitable hardware or hardware executing instructions encoded on non-transitory machine-readable medium.

It may be understood that blocks of the method 400-1000 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. Further, although the method 400-1000 may be implemented in a variety of systems, the methods 400-1000 are described in relation to the system 100, for ease of explanation. In an example, the blocks of the methods 400-1000 may be performed by a processing resource, such as the processor 102.

Figure 4:
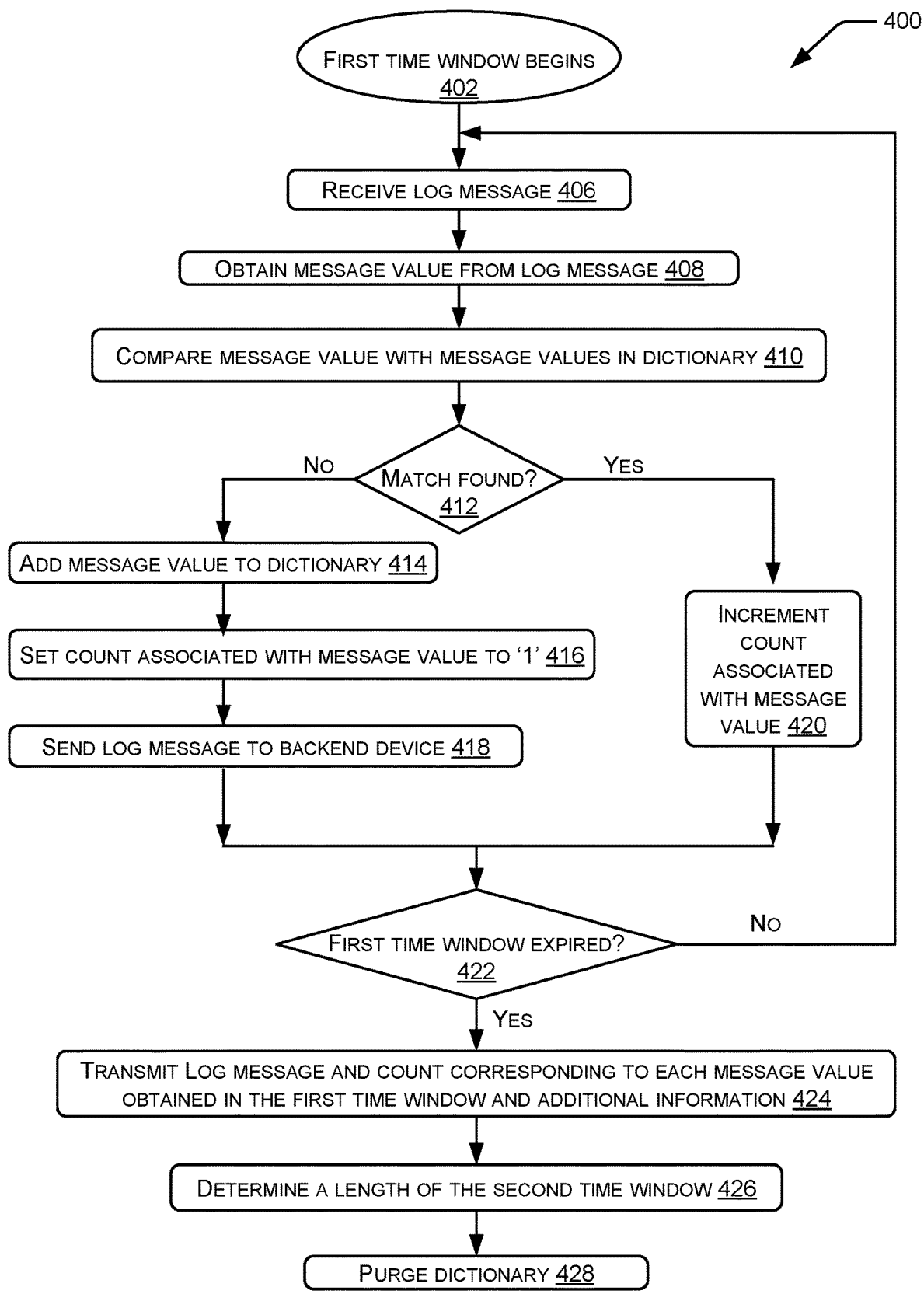
FIG. 4 illustrates a method performed during a time window and upon expiration of the time window, according to an example implementation of the present subject matter.

Referring to FIG. 4, FIG. 4 illustrates a method 400 performed during a time window and upon expiration of the time window, according to an example implementation of the present subject matter. The method 400 may be performed by the system 100. For the ease of explanation, the method 400 is explained in view of an example in which the dictionary 212 is a dynamic dictionary with message values stored as a list. However, the method 400 can be adapted and used for a static dictionary or nested dictionary as well.

At block 402, a first time window begins. The dictionary 212 may be initialized upon the beginning of the time window. Alternatively, the dictionary 212 may be initialized upon the expiry of the previous time window. The initialization of the dictionary 212 may include purging of the dictionary 212, i.e., eviction of the message values and counts in the dictionary 212.

At block 406, a log message is received. At block 408, a message value is obtained from the log message. The obtained message value may be the first message value. Accordingly, at block 410, the first message value is compared with message values in the dictionary 212. Since the dictionary 212 is empty, at block 412, it is determined that the first message value obtained does not match with any message value in the dictionary 212. Accordingly, at block 414, the first message value may be added to the dictionary 212. Further, at block 416, a count associated with the first message value is set to one. Since the log message is the first log message received in the first time window having the first message value, at block 418, the log message is transmitted to the backend device 204.

If, subsequently, a log message having the first message value is received at block 406, at block 412, it may be determined that the message value obtained from the log message matches with a message value in the dictionary 212. Therefore, at block 420, the count associated with the first message value may be incremented. However, the log message is not transmitted to the backend device 204, as a log message having the first message value is already transmitted to the backend device 204 in the first time window.

If, at block 406, a log message is received having the second message value, at block 412, it may be determined that the message value obtained from the log message does not match with any message value in the dictionary 212. Therefore, the second message value may be added to the dictionary 212 and the count associated with the second message value may be set to one at blocks 414 and 416 respectively. Further, at block 418, the log message having the second message value is transmitted to the backend device 204, as the log message is the first log message received in the first time window and having the second message value. In this manner, a log message is transmitted corresponding to every message value different than the message values in the dictionary 212, when the message value is obtained from an incoming log message. Therefore, one log message per message value is transmitted to the backend device 204 without any delay. Accordingly, the backend device 204 may initiate taking corrective actions corresponding to the log message without any delay.

At block 422, it may be determined if the first time window has expired. If yes, at block 424, one log message corresponding to each message value obtained in the first time window is transmitted to the backend device 204. In addition, the count associated with each message value may also be transmitted. Further, additional information regarding log messages having a message value may be transmitted. The additional information may include the metrics indicating a temporal distribution of incoming log messages corresponding to the message value in the first time window. The metrics may include, for example, the length of the first time window, the last timestamp within the first time window in which a log message corresponding to the message value was received, and a mean inter-arrival time between log messages corresponding to the message value, as explained earlier. The additional information may be utilized by the backend device 204 to determine an underlying cause of generation of the log messages and to take a corrective action. Thus, the transmission of the additional information helps to provide various pieces of information to be used to take a corrective action at the backend device 204, without burdening the backend device 204 with redundant incoming log messages.

The log message corresponding to a message value that is transmitted upon expiry of the first time window, the count corresponding to the message value, and the metrics indicating a temporal distribution of incoming log messages corresponding to the message value may be collectively referred to as a marker message corresponding to the message value. Thus, for one time window, two messages—one log message and one marker message—corresponding to a message value are transmitted to the backend device 204 regardless of the number of log messages having the message value received in the time window, thereby achieving deduplication and avoiding overwhelming of the backend device 204.

At block 426, a length of the second time window, which is subsequent to the first time window and in which the subsequent counting of the log messages associated with message values is performed, is determined. In an example, the beginning of the second time window may overlap with the end of the first time window. The determination of the length of the second time window is explained with reference to FIG. 5. Further, at block 428, the dictionary 212 may be purged.

Although the method 400 is explained with reference to a dynamic dictionary, the method 400 can be adapted for the static dictionary as well. For instance, the initialization of the dictionary 212 may involve resetting the counts associated with each message value in the dictionary 212, instead of purging the dictionary 212. Further, a log message may be transmitted to the backend device 204 if a message value obtained from the log message has a corresponding count of zero in the dictionary 212. Still further, upon expiry of the first time window, the counts associated with the message values may be reset.

Figure 5:
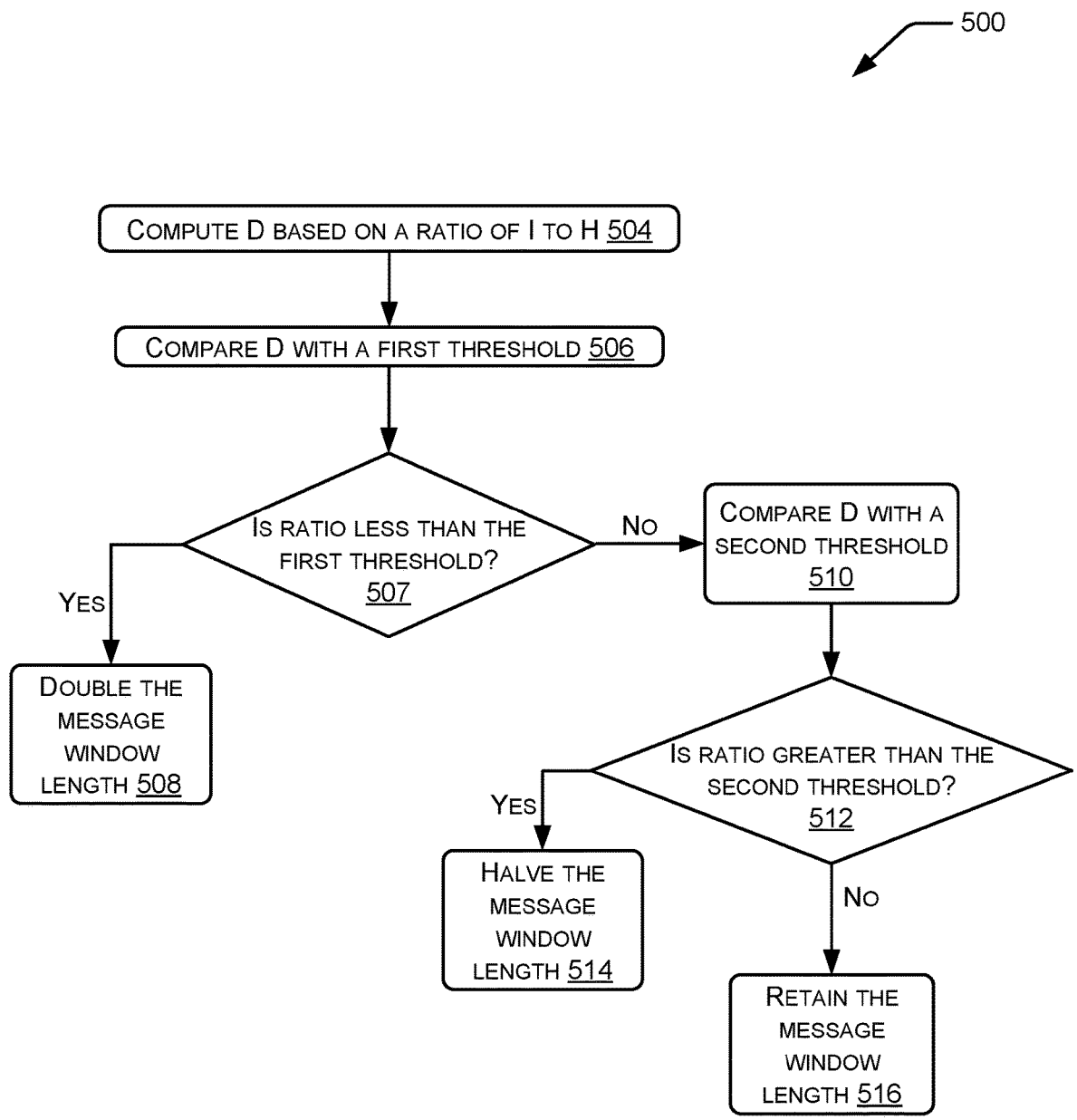
FIG. 5 illustrates a method for determination of a length of a second time window, according to an example implementation of the present subject matter.

FIG. 5 illustrates a method 500 for determination of a length of the second time window, according to an example implementation of the present subject matter. The method 500 may be performed by the system 100, such as by the processor 102.

A length of a time window may affect the number of redundant messages, i.e., messages having the same message value, transmitted to the backend device 204. This is because, as explained earlier, two messages (one log message and one marker message) corresponding to one message value are transmitted to the backend device 204 for each time window. Accordingly, if the length of the time window is short, several messages corresponding a message value may be transmitted. Further, if an incoming rate of log messages having a particular message value is high across time windows, several messages may be transmitted. For instance, consider that the incoming rate of the log messages having the first message value is 100 log messages per minute and that each time window has a length of five seconds. Therefore, 20 log messages and 20 marker messages corresponding to the first message value are transmitted to the backend device 204 in a minute. While there is a reduction in the number of messages transmitted, the number of messages may still be large enough to overwhelm the backend device 204 and the system 100, as generation of marker messages also consume resources. Accordingly, in the present subject matter, the length of a subsequent time window is adapted to control the number of redundant log messages transmitted to the backend device 204.

The length of the second time window may be determined based on the number of log messages received in the first time window and the number of distinct message values obtained in the first time window. The number of log messages and the number of distinct message values indicate the number of messages transmitted for a particular number of incoming log messages. A ratio of the number log messages received to the number of messages transmitted to the backend device 204 may be referred to as a deduplication ratio (D) and may be mathematically represented as below:

$$D = I/2H,$$

where I is the number of log messages received in the first time window and H is the number of distinct message values received in the first time window. Here, the value H is multiplied by 2 because two messages (one log message and one marker message) are transmitted corresponding to each distinct message value. It may be noted that H equals the size of the dictionary 212 if the dictionary 212 is a dynamic dictionary. If the dictionary 212 is a static dictionary, H equals the number of message values in the dictionary 212 having a corresponding non-zero count.

A small value of the deduplication ratio indicates that a relatively large number of messages are transmitted, which may potentially overwhelm the backend device 204. Therefore, if the deduplication ratio is low, the length of the second time window may be made longer than that of the first time window, so that more deduplication is performed, and fewer number of messages are transmitted to the backend device 204. Accordingly, at block 504, the deduplication ratio D is computed based on a ratio of the number of messages received to a number of distinct message values. At block 506, the deduplication ratio D is compared with a first threshold. If the deduplication ratio is less than the first threshold, it may be determined that the second time window is to have a longer length than the first time window, so that fewer messages are transmitted to the backend device. Accordingly, at block 508, the length of the second time window may be set to a greater length than the first time window. In an example, the length of the second time window may be set to a value double that of the length of the first time window.

If the deduplication ratio is greater than the first threshold, at block 510, the deduplication ratio may be compared with a second threshold that is greater than the first threshold. If, at block 512, it is determined that the deduplication ratio is greater than the second threshold, it may be determined that the number of messages transmitted is less than what the backend device 204 can handle and that more messages can be transmitted to the backend device 204 without overwhelming it. Accordingly, at block 514, the length of the second time window may be set to a shorter length than the first time window. In an example, the length of the second time window may be set to a value half of the length of the first time window. If the deduplication ratio is less than the second threshold, at block 516, it may be determined that the second time window may have the same length as the first time window.

Figure 6:
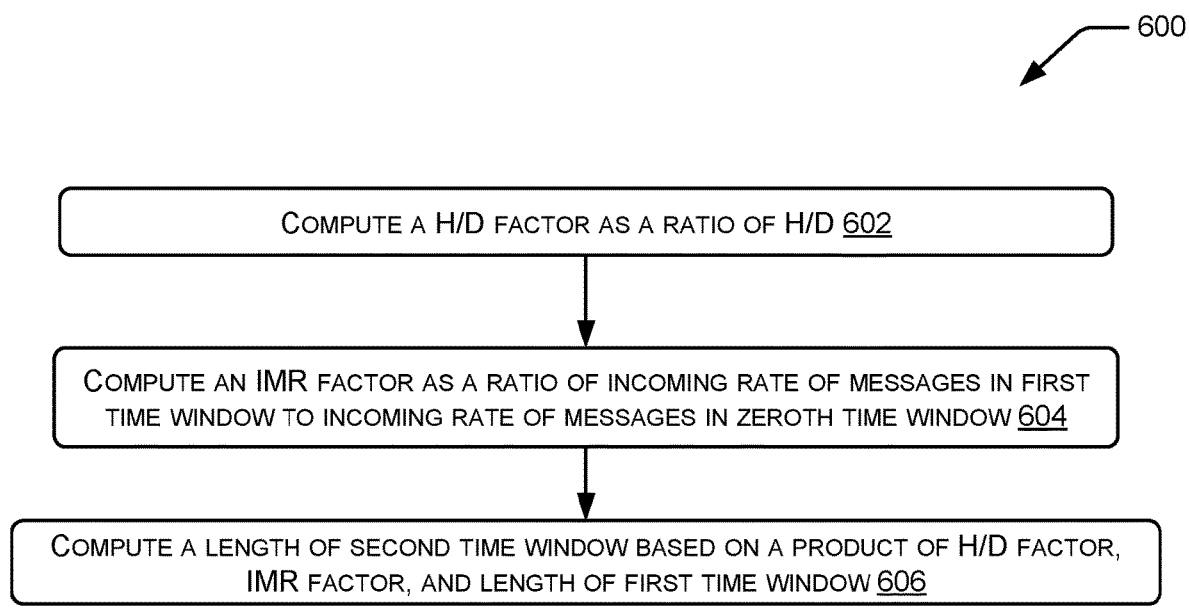
FIG. 6 illustrates a method for determination of a length of a second time window, according to an example implementation of the present subject matter.

FIG. 6 illustrates a method 600 for determination of a length of the second time window, according to an example implementation of the present subject matter. The method 600 may be performed by the system 100. Here, in addition to the deduplication ratio, the number of distinct message values obtained during the first time window is also considered to determine the length of the second time window. Since a large number of distinct message values in the first time window indicates that a greater number of messages were transmitted to the backend device 204, the length of the second time window may have to be increased for a large number of distinct message values. Correspondingly, the length of the second time window may have to be decreased for a small number of distinct message values. Thus, the length of the second time window is to be proportional to the number of distinct message values obtained in the first time window. Further, as explained earlier, the length of the second time window is to be inversely proportional to the deduplication ratio.

Accordingly, at block 602, a factor may be computed as a ratio of the number of distinct message values to the deduplication ratio, i.e., H/D. The factor may be referred to as a first factor or an H/D factor, and may be multiplied with the length of the first time window to compute the length of the second time window.

In an example, the length of the second time window may be determined based on incoming rate of log messages in the previous time windows, as the incoming rate indicates a growth or decrease in the number of log messages received over time. Therefore, using the incoming rates of log messages, the existence of a flood scenario can be identified. To determine the growth or decrease in the number of log messages received, at block 604, a ratio of incoming rate of log messages in the first time window to incoming rate of log messages in a zeroth time window before the first time window may be computed. This ratio may be referred to as a second factor or incoming message rate (IMR) factor. A high value of the IMR factor indicates that the incoming rate of log messages is increasing with time. Therefore, for a high value of the IMR factor, the length of the second time window is to be greater than that of the first time window, to avoid overwhelming of the backend device 204 due to the increase in the incoming rate. Thus, the length of the second time window is to be proportional to the IMR factor. Therefore, the length of the second time window may be arrived at by multiplying the IMR factor with the length of the first time window.

In an example, both the IMR factor and the H/D factor may be utilized for determining the length of the second time window. For instance, at block 606, the length of the second time window may be computed based on a product of the length of the first time window, the IMR factor, and the H/D factor. The length of the second time window may be mathematically represented as below:

$$L2 = L1 \times IMR\ factor \times H/D\ factor \times A$$

where, L1 and L2 are lengths of the first time window and the second time window respectively. Further, 'A' may be an adjustment factor that may be used to adjust the values of subsequent time windows. The value of 'A' may be configured, for example, based on observations regarding the performance of the backend device 204 for various lengths of time windows. In an example, a machine learning technique may be utilized to observe the performance of the backend device 204 for various values of A and to accordingly adjust the value of A.

In the above examples, the dynamic dictionary is explained as being purged upon expiry of a time window and repopulated during the subsequent time window. While the purging and repopulation may keep the dictionary size small, in some cases, message values may be frequently evicted and re-added to the dictionary 212. For instance, consider that, upon expiry of the first time window, the first message value is evicted from the dictionary 212 as part of the purging. Consider also that a log message having the first message value is received soon after the second time window commences. In such a case, the first message value is removed and added back to the dictionary 212 is a short span of time, causing wastage of resources. To prevent the overhead caused by frequent removal and addition of message values to the dictionary 212, in an example, the message values may be retained in the dictionary 212 even after the expiry of the first time window, as will be explained below.

Figure 7:
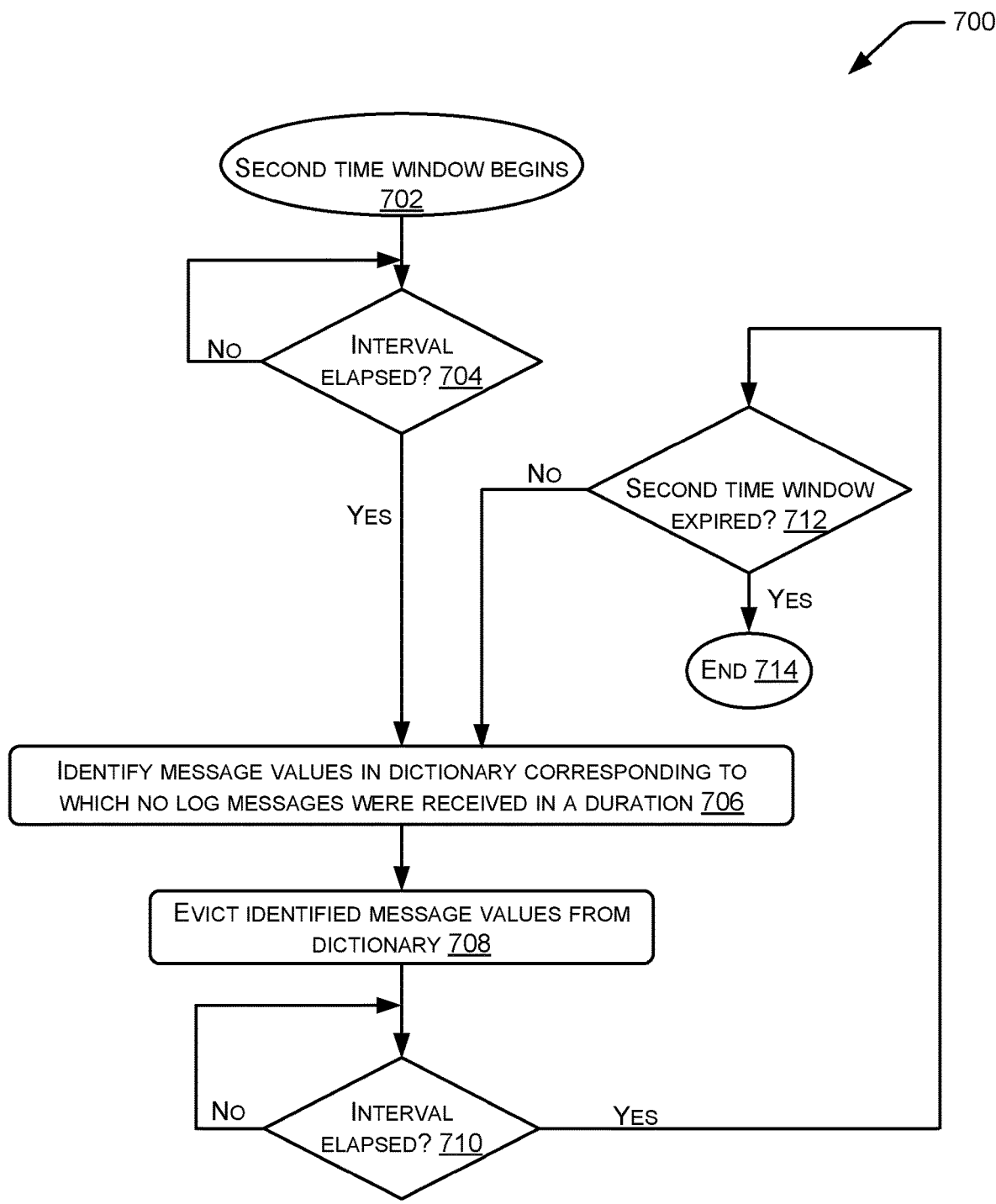
FIG. 7 illustrates a method for transmission of marker messages, according to an example implementation of the present subject matter.

FIG. 7 illustrates a method 700 for transmission of marker messages, according to an example implementation of the present subject matter. The method 700 may be performed by the system 100. At block 702, the second time window is initialized upon expiry of the first time window. At this time, the dictionary 212 may have all the message values obtained during the first time window. Further, the dictionary 212 may have a last seen timestamp associated with each message value, which indicates the timestamp at which the most recent log message having the message value was received in the first time window. However, the counts associated with the message values may be zero, so that the counting may be started afresh in the second time window.

At block 704, it may be determined if an interval has elapsed since the commencement of the second time window. The interval may be a mathematical factor of the length of the second time window. For instance, if the length of the second time window is five minutes, the interval may be one minute.

At block 706, a message value in the dictionary 212 corresponding to which no log message was received in a duration in the past is identified. A length of the duration may be the same as the length of the second time window. For instance, if the length of the second time window is five minutes, it may be determined if the first message value (which is present in the dictionary 212) is obtained from a log message received in the past five minutes. If a message value is identified such that no log message corresponding to the message value has been received in the duration, the message value is evicted from the dictionary 212. In an example, the identification of message values at block 706 may be based on the last-seen timestamps in the dictionary 212.

The eviction of the message values at block 708 may be repeated at regular intervals. For instance, at block 710, it may be determined if an interval has elapsed since the last eviction of message values. If yes, at blocks 706 and 708, the identification of message values and eviction of identified message values are repeated. Accordingly, multiple sets of identification and eviction may be performed in the second time window. The periodic eviction of message values ensures that message values corresponding to log messages that are not being received are not stored in the dictionary 212. Thus, the dictionary 212 is free of obsolete message values. Further, since message values in the dictionary 212 are not evicted based on expiry of time windows, the overhead associated with removal and addition of a message value in a short span of time may be avoided.

In an example, if it is determined at block 710 that the interval has elapsed, at block 712, it may be determined is the second time window has expired. Further, the identification at block 706 may be performed if the second time window has not yet expired. If the second time window has expired, the method 700 ends at block 714.

In an example, the interval specified at block 710 may be the same as the interval specified at block 704, and may be a mathematical factor of the length of the second time window. By making the interval a mathematical factor of the length of the second time window, an eviction may be performed at the time of expiry of the second time window. For example, consider that the length of the second time window is five minutes and that the interval is two minutes. In such a case, while the eviction may be performed at the end of the second minute and the fourth minute into the second time window, no eviction may be performed at the end of the fifth minute. Accordingly, the message values that are retained in the dictionary 212 for a third time window subsequent to the second time window may include some obsolete message values. If, in contrast, the interval is one minute (a factor of the length of the second time window), an eviction may be performed at the end of the fifth minute as well, thereby preventing retention of obsolete messages in the dictionary 212.

In an example, the system 100 may prioritize the log messages into different priorities and may handle log messages of one priority differently than log messages of another priority for deduplication. A priority of a log message may refer to the seriousness of an issue conveyed by the log message. In an example, the system 100 may prioritize log messages based on a severity of the log messages. The severity of a log message may be, for example, error, warning, or information (also referred to as info). Accordingly, a log message may be referred to as having a first priority if it is an error log message, a second priority if it is a warning log message, or a third priority if it is an info log message. A log message of the first priority (FP) may be referred to as an FP log message. Similarly, a log message of the second priority (SP) and a log message of the third priority (TP) may be referred to as a SP log message and a TP log message respectively. Hereinafter, the handling of log messages is explained with reference to two priorities: the FP and the SP, where FP is higher than SP. However, the explanation provided below can be adapted for a scenario with more priorities as well.

The system 100 may handle FP log messages independently of SP log messages, for transmission of marker messages. For instance, the system 100 may count the number of FP log messages and the number of distinct message values from the FP log messages independently of the SP log messages. Further, a time window during which counting of log messages and distinct message values is performed may differ between the two priorities. For instance, while the counting of FP log messages may be performed during the first time window, the counting of SP log messages may be performed during a third time window that may partially overlap with the first time window. Accordingly, the lengths of time windows during which the counting is performed may differ from one priority to another.

Figure 8:
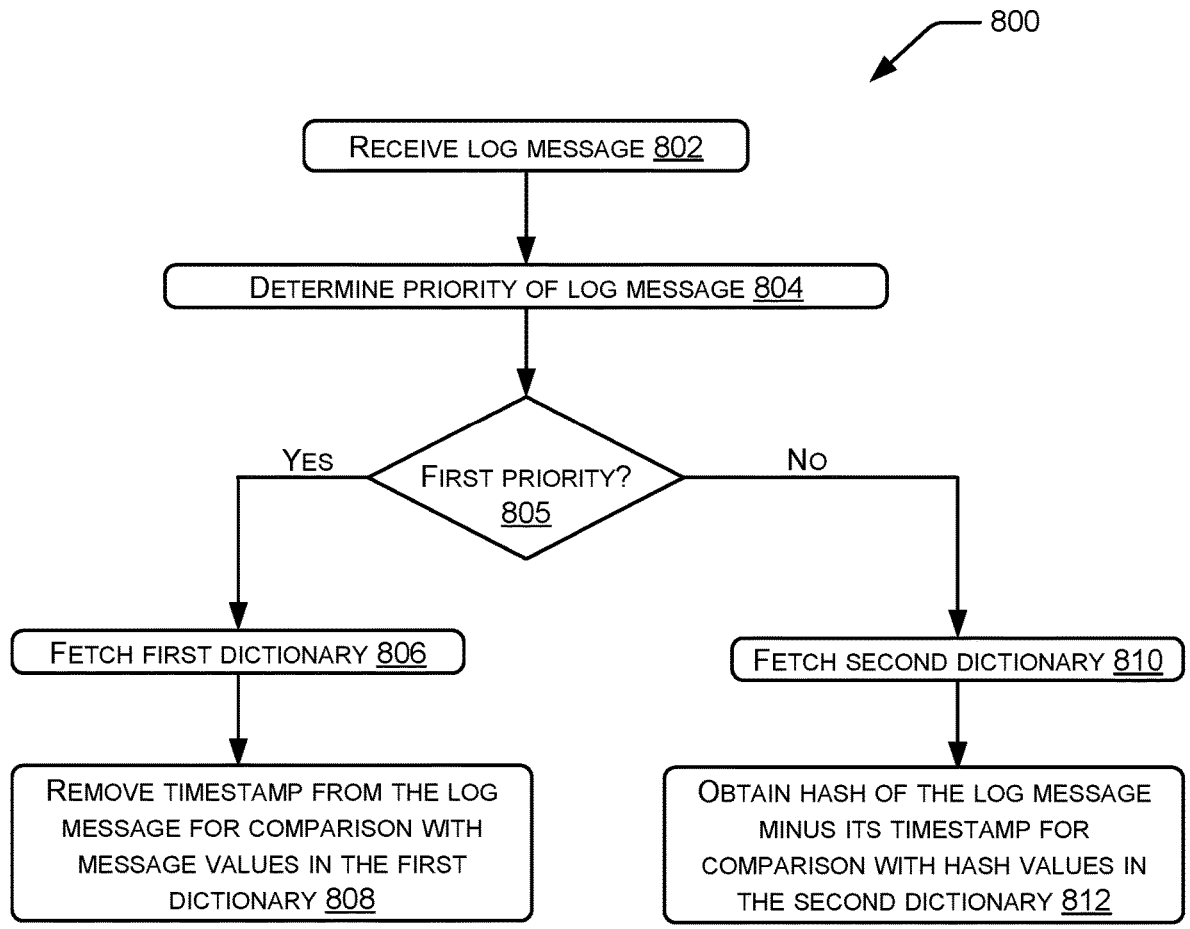
FIG. 8 illustrates a method for handling log messages of different priorities, according to an example implementation of the present subject matter.

FIG. 8 illustrates a method 800 for handling the log messages of different priorities, according to an example implementation of the present subject matter. The method 800 may be performed by the system 100.

In an example, the message values obtained from log messages may be different for different priorities. For instance, the message value may be the log message except the timestamp for FP log messages, and the message value may be the hash of the log message except timestamp for SP log messages. Accordingly, while the dictionary 212 may store FP log messages except timestamps as message values, the dictionary 212 may store hash values of SP log messages except their timestamps. Further, in an example, the system 100 may utilize different dictionaries corresponding to log messages of different priorities. For instance, the dictionary 212 may be utilized for comparison with FP log messages and another dictionary (not shown in FIG. 8) for comparison with SP log messages. For the purpose of clarity, the dictionary 212 may be referred to as the first dictionary 212 and the other dictionary may be referred to as the second dictionary. The first dictionary 212 may store FP log messages except their timestamps and the second dictionary may store hash values of SP log messages except their timestamps.

Accordingly, at block 802, when a log message is received, the priority of the log message is determined at block 804. In an example, the priority may be determined based on a severity attribute of the log message. If the log message is an FP log message, at block 806, the first dictionary 212 is fetched. Further, at block 808, the timestamp is removed from the log message to obtain a message value of the log message. Thereafter, the message values in the first dictionary 212 are compared with the message value from the log message. Subsequently, the count is incremented in the first dictionary 212 and marker messages are transmitted as explained above. If the log message is a SP log message, at block 810, the second dictionary is fetched. Further, at block 812, a hash value of the log message except the timestamp is obtained and compared with the hash values in the second dictionary, for incrementing count of a corresponding message value.

As mentioned earlier, the length of the time window, for which the counting is carried out and upon the expiration of which marker messages are transmitted, may be different for log messages of different priorities. Further, the length of time windows may be smaller for higher priorities. For instance, a time window corresponding to FP log messages may have a smaller length as compared to that corresponding to SP log messages. To achieve time windows of smaller lengths for higher priority, the thresholds against which deduplication ratios are compared to adjust the length of time windows may also be different for the different priorities. For instance, the value of the first threshold may be smaller for SP than that of FP. Therefore, the increase in the length of time window may be performed more frequently for SP. Similarly, the value of the second threshold may be smaller for FP. Therefore, the decrease in the length of time window may be performed more frequently for FP. Accordingly, marker messages corresponding to FP may be transmitted more frequently. The thresholds corresponding to FP and SP may be referred to as FP thresholds and SP thresholds respectively.

Although the priority of log messages is explained as being determined based on severity of log messages, in some examples, other attributes of log messages may be utilized to prioritize the log messages. The other attributes may be, for example, a log generating component of the source device 202. A log message generated by the kernel may be an FP log message while a log message generated by the user space may be a SP log message.

Figure 9:
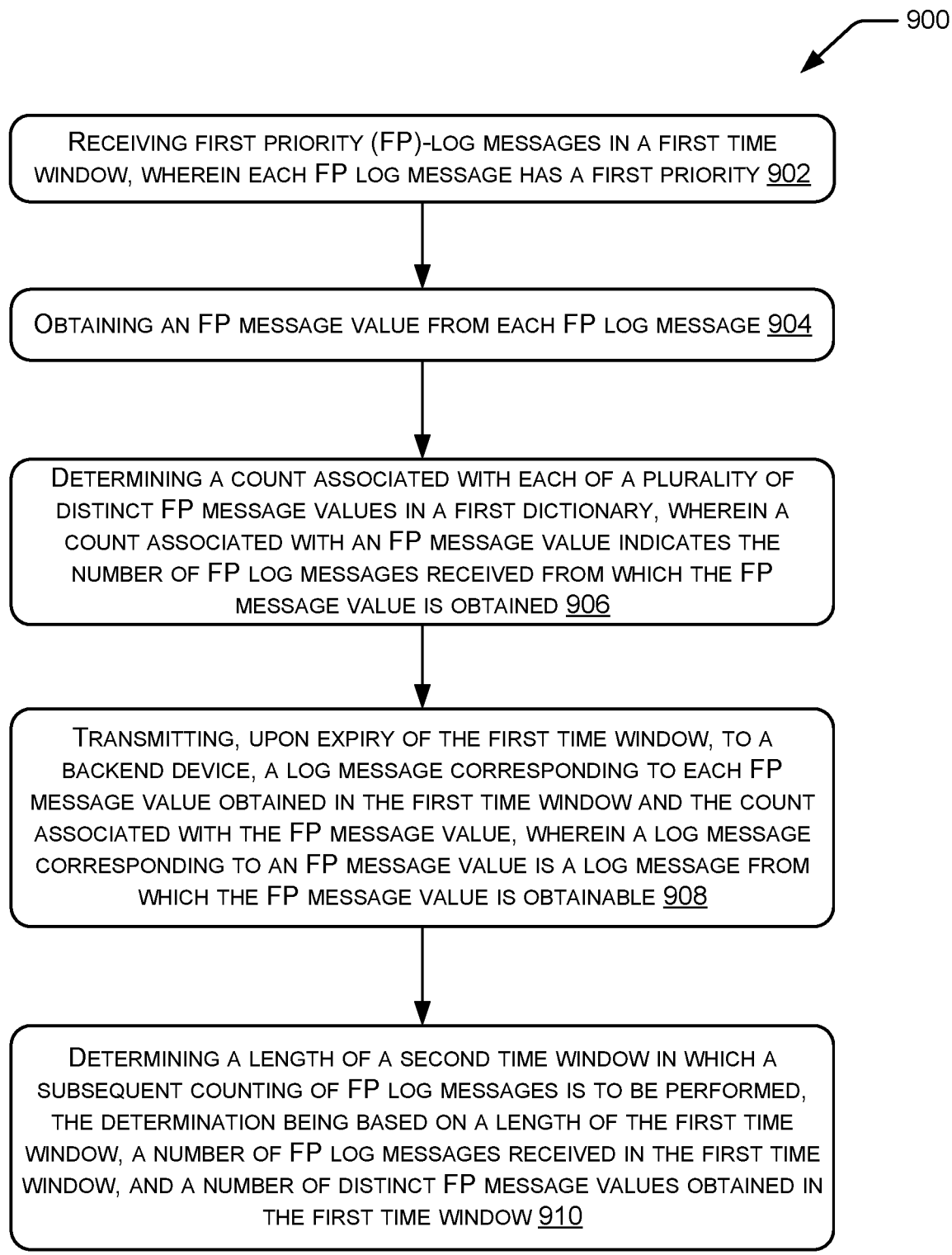
FIG. 9 illustrates a method for performing adaptive time window-based deduplication of log messages, according to an example implementation of the present subject matter.

FIG. 9 illustrates a method 900 for performing adaptive time window-based deduplication of log messages, according to an example implementation of the present subject matter. The method 900 may be performed by the system 100.

Referring to method 900, at block 902, first priority (FP) log messages may be received in a first time window. Each FP log message has a first priority. The FP log message may be, for example, the FP log message explained with reference to FIG. 8. In an example, the FP log message may be an error log message.

At block 904, an FP message value may be obtained from each FP log message. The message value may be, for example, the whole of the FP log message, whole of the log message except a particular part of the log message, an identifier of the FP log message, a hash of the FP log message, parts of the FP log message other than unique identifiers in the FP log message, or combinations thereof.

At block 906, a count associated with each of a plurality of distinct FP message values in a first dictionary is determined. The determination may be performed upon expiry of the first time window. The plurality of distinct message values may be the message values obtained from log messages received in the first time window. A count associated with an FP message value indicates the number of FP log messages received from which the FP message value is obtained. The first dictionary may be, for example, the dictionary 212. The FP message values stored in the first dictionary are referred to as distinct message values as the first dictionary stores a single copy of a message value, as explained earlier. The determination at block 906 may be preceded by counting a number of FP log messages received in the first time window from which an FP message value is obtained, as explained with reference to FIGS. 2 and 3(a).

At block 908, upon expiry of the first time window, a log message corresponding to each FP message value obtained in the first time window and the count associated with the FP message value are transmitted to a backend device. A log message corresponding to an FP message value is a log message from which the FP message value can be obtained, as explained with reference to FIG. 2. In an example, the log message and the count may be sent as part of a marker message, which may also include metrics indicating temporal distribution of incoming log messages, as explained earlier.

At block 910, a length of a second time window in which a subsequent counting of FP log messages is to be performed is determined. The determination may be based on a length of the first time window, a number of FP log messages received in the first time window, and a number of distinct FP message values obtained in the first time window, which may be CH' explained with reference to FIG. 5. In an example, determining the length of the second time window includes determining a first ratio of the number of FP log messages received in the first time window to the number of distinct FP message values obtained in the first time window and comparing the first ratio with a first FP threshold and a second FP threshold, as explained with reference to FIG. 5. The first FP threshold is smaller than the second FP threshold. The first FP threshold and the second FP threshold may be the first and second thresholds corresponding to the FP, as explained with reference to FIG. 8.

In an example, upon expiry of the first time window, counts associated with the plurality of distinct FP message values are reset in the first dictionary. However, the FP message values in the first dictionary are retained. In the second time window, an FP message value in the first dictionary corresponding to which no log message was received in a duration is identified. A length of the duration equals the length of the second time window. Subsequently, the identified FP message value may be evicted from the first dictionary. The identification and eviction of FP message values may be performed at regular intervals. An interval at which the identification and eviction of FP message values is performed may be a mathematical factor of the length of the second time window, as explained with reference to FIG. 6.

In an example, the first dictionary is a nested dictionary and stores a third FP message value and a fourth FP message value nested in a first FP message value, as illustrated in FIG. 3(b). Further, in response to receiving an FP log message, the method 900 may include obtaining a plurality of FP message values from the FP log message. The plurality of FP message values may be, for example, a component that generated the FP log message or to which the FP log message relates and a body of the FP log message generated or the body of the FP log message except the unique identifiers in the body. One of the plurality of FP message values is compared with the first FP message value. If the obtained FP message value matches with the first message value, another of the plurality of FP message values is compared with the third FP message value. If the other FP message value matches with the third FP message value, a count associated with a combination of the first FP message value and the third FP message value is incremented, as explained with reference to FIG. 3(b).

In an example, log messages of another priority may be received and handled independently of the FP log messages, as will be explained below.

Figure 10:
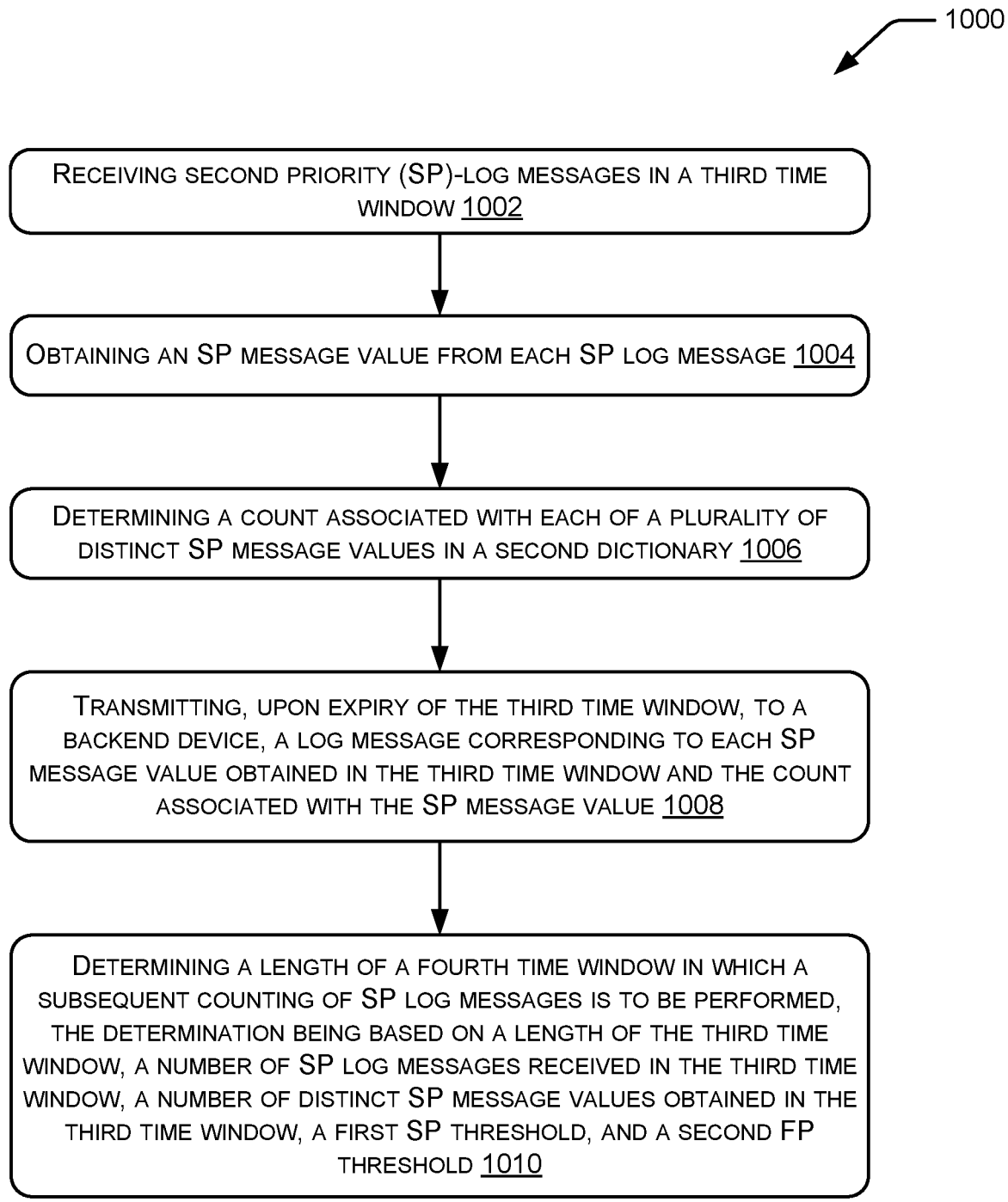
FIG. 10 illustrates a method for counting and transmission of marker messages corresponding to second priority (SP) log messages, according to an example implementation of the present subject matter.

FIG. 10 illustrates a method for counting and transmission of marker messages corresponding to second priority (SP) log messages, according to an example implementation of the present subject matter. At block 1002, second priority (SP) log messages may be received in a third time window. The SP log messages may be, for example, information log messages. The third time window may be different than the first time window and the second time window and may partially overlap with the first time window and/or the second time window.

At block 1004, an SP message value may be obtained from each SP log message. In an example, the SP message value may be different than the FP message value. For instance, while an FP message value may be the FP log message or the FP log message except its timestamp, a SP message value may be a hash of an SP log message or the SP log message except its timestamp, as explained with reference to FIG. 8. Accordingly, obtaining the SP message value from an SP log message may involve removing a timestamp from the SP log message and computing a hash of a remainder of the SP log message, i.e., the SP log message except the timestamp.

At block 1006, a count associated with each of a plurality of distinct SP message values stored in a second dictionary is determined. The second dictionary may correspond to the SP, while the first dictionary may correspond to FP. If FP message values obtained are FP log messages except their timestamps and SP message values obtained are hashes of SP log messages except their timestamps, the first dictionary may store a plurality of FP log messages except their timestamps and the second dictionary may store hashes of a plurality of SP log messages except their timestamps. Accordingly, the method 1000 may include comparing the hash of an SP log message except the timestamp with the hashes in the second dictionary.

At block 1008, upon expiry of the third time window, a marker message is transmitted to a backend device corresponding to each SP message value obtained in the third time window and the count associated with the SP message value.

At block 1010, a length of a fourth time window in which a subsequent counting of SP log messages is to be performed is determined. The determination may be based on a length of the third time window, a number of SP log messages received in the third time window, and a number of distinct SP message values obtained in the third time window. In an example, determining the length of the fourth time window includes determining a second ratio of the number of SP log messages received in the third time window to the number of distinct SP message values obtained in the first time window. Further, the second ratio is compared with a first SP threshold and a second SP threshold. The first SP threshold and the second SP threshold may correspond to the SP and may be different than the first FP threshold and the second FP threshold, which correspond to the FP. The first SP threshold may be smaller than the first FP threshold. Therefore, the increase in the length of time window may be performed more frequently for SP. Similarly, the second FP threshold may be smaller than the second SP threshold. Therefore, the decrease in the length of time window may be performed more frequently for FP.

Figure 11:
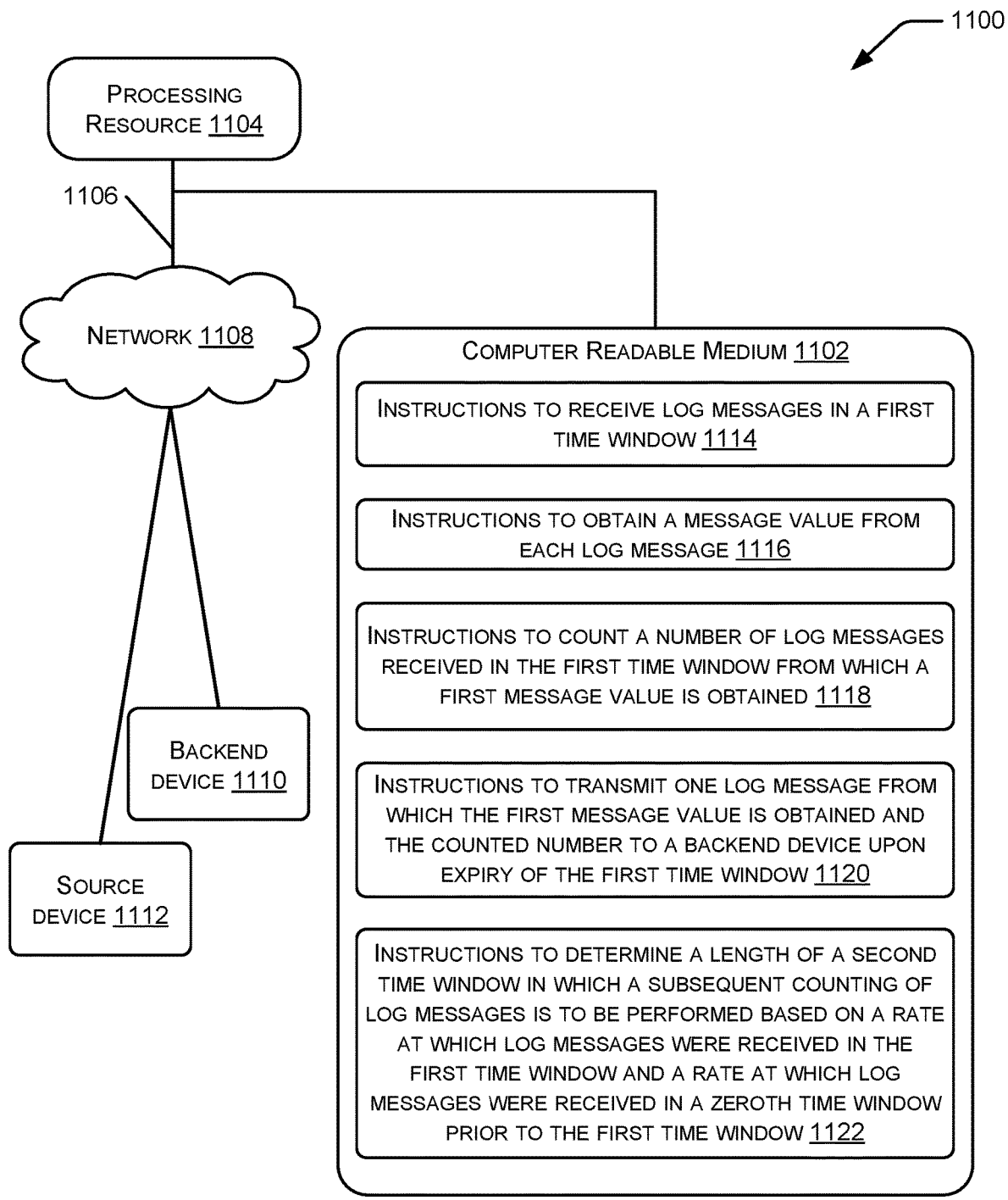
FIG. 11 illustrates a computing environment implementing a non-transitory computer-readable medium for performing adaptive time window-based deduplication of log messages, according to an example implementation of the present subject matter.

FIG. 11 illustrates a computing environment 1100 implementing a non-transitory computer-readable medium for performing adaptive time window-based deduplication of log messages, according to an example implementation of the present subject matter. In an example, the non-transitory computer-readable medium 1102 may be utilized by a system, such as the system 100. In an example, the computing environment 1100 may include a processing resource 1104 communicatively coupled to the non-transitory computer-readable medium 1102 through a communication link 1106. The processing resource 1104 may be, for example, the processor 102.

The non-transitory computer-readable medium 1102 may be, for example, an internal memory device or an external memory device. In an example, the communication link 1106 may be a direct communication link, such as any memory read/write interface. In another example, the communication link 1106 may be an indirect communication link, such as a network interface. In such a case, the processing resource 1104 may access the non-transitory computer-readable medium 1102 through a network 1108. The network 1108 may be a single network or a combination of multiple networks and may use a variety of different communication protocols.

The processing resource 1104 and the non-transitory computer-readable medium 1102 may also be communicatively coupled to a backend device 1110, such as the backend device 204, and a source device 1112, such as the source device 202. In an example, the non-transitory computer-readable medium 1102 may be utilized by the source device 1112, so that the functions for counting and transmission of messages can be performed by the source device 1112.

In an example implementation, the non-transitory computer-readable medium 1102 includes a set of computer-readable instructions for counting and transmission of log messages. The set of computer-readable instructions can be accessed by the processing resource 1104 through the communication link 1106 and subsequently executed.

Referring to FIG. 11, in an example, the non-transitory computer-readable medium 1102 includes instructions 1114 that cause the processing resource 1104 to receive log messages in a first time window. The non-transitory computer-readable medium 1102 includes instructions 1116 that cause the processing resource 1104 to obtain a message value from each log message.

The non-transitory computer-readable medium 1102 includes instructions 1118 that cause counting of a number of log messages received in the first time window from which a first message value is obtained. The counting may be performed with the help of a dictionary, such as the dictionary 212.

The non-transitory computer-readable medium 1102 includes instructions 1120 that cause transmission of one log message corresponding to the log messages from which the first message value is obtained and the counted number to the backend device 1110 upon expiry of the first time window. In an example, the instructions cause transmission, upon expiration of the first time window, of metrics indicating temporal distribution of incoming log messages corresponding to the first message value in the first time window. The metrics include a length of the first time window, last timestamp within the first time window at which a log message corresponding to the first message value was received, mean inter-arrival time of log messages corresponding to the first message value, and a histogram indicating the temporal distribution, as explained at block 324. The metrics, the log message, and the count may be collectively referred to as a marker message.

The non-transitory computer-readable medium 1102 includes instructions 1122 that cause determination of a length of a second time window in which a subsequent counting of log messages is to be performed based on a rate at which log messages were received in the first time window and a rate at which log messages were received in a zeroth time window prior to the first time window, as explained with reference to FIG. 6. In an example, to determine the length of the second time window, the instructions are executable to compute a ratio of the rate at which log messages were received in the first time window to the rate at which log messages were received in a zeroth time window prior to the first time window. The ratio may be the IMR factor. Further, the length of the second time window is determined based on a product of the ratio and the length of the first time window.

In an example, the instructions are executable to determine the length of the second time window based on a number of distinct message values obtained from log messages received in the first time window, as explained with reference to FIGS. 4 and 5. In an example, prior to transmitting the log message and the counted number to the backend device, the instructions are executable to transmit, to the backend device, the log message that is received for the first time in the first time window and from which the first message value is obtainable, as explained at block 318.

The present subject matter reduces the number of redundant log messages transmitted to a backend device, thereby preventing overloading of the backend device. Further, messages can be processed by the backend device at near-real time. The deduplication techniques of the present subject matter are lightweight, and can be performed at the source device that generates the log messages. The resource consumption of the source device generating the log messages can also be reduced, as the number of log messages to be transformed for transmission to the backend device is reduced.

The techniques can also be implemented in an intermediate device that is between the backend device and the source device. The implementation in the intermediate device simplifies the loading of settings, such as threshold settings, time window settings, and time period settings, and the loading of dictionary, as the loading is not to be performed is each source device.

Using the techniques of the present subject matter, the network traffic generated by the transmission of log messages can be significantly reduced. Further, the techniques of the present subject matter can be achieved with little or no change to the backend device and the components that generate the log messages. The adjustment of the lengths of the subsequent time windows based on various parameters ensures that the number of redundant messages received by the backend device can be reduced even at times of flood scenarios of random durations.

Although examples and implementations of present subject matter have been described in language specific to structural features and/or methods, it is to be understood that the present subject matter is not necessarily limited to the specific features or methods described. Rather, the specific features and methods are disclosed and explained in the context of a few example implementations of the present subject matter.

We claim:

1. A system comprising:
a processor; and
a non-transitory storage medium comprising instructions executable on the processor to:
receive a plurality of log messages in a first time window;
obtain a message value from each log message of the plurality of log messages;
count a number of log messages of the plurality of log messages received in the first time window from which a first message value is obtained;
transmit a first log message from which the first message value is obtained and the counted number to a backend device upon in response to expiry of the first time window; and
determine a length of a second time window in which a subsequent counting of log messages is to be performed, the determination of the length of the second time window based on a number of the plurality of log messages received in the first time window and a number of distinct message values obtained from the plurality of log messages in the first time window.

2. The system of claim 1, wherein, to determine the length of the second time window, the instructions are executable on the processor to:
compute a ratio of the number of the plurality of log messages received in the first time window to the number of distinct message values obtained in the first time window;
set the length of the second time window to greater than a length of the first time window in response to the ratio being less than a first threshold; and
set the length of the second time window to less than the length of the first time window in response to the ratio being greater than a second threshold, the second threshold being greater than the first threshold.

3. The system of claim 1, wherein, to determine the length of the second time window, the instructions are executable on the processor to:
compute a ratio of the number of the plurality of log messages received in the first time window to the number of distinct message values obtained in the first time window;
compute a first factor based on the ratio and the number of distinct message values obtained in the first time window;
compute a second factor based on a ratio of a rate at which log messages were received in the first time window to a rate at which log messages were received in another time window prior to the first time window; and
determine the length of the second time window based on a product of a length of the first time window, the first factor, and the second factor.

4. The system of claim 1, wherein the instructions are executable on the processor to:
transmit, in response to the expiry of the first time window, metrics indicating a temporal distribution of incoming log messages corresponding to the first message value in the first time window, the metrics comprising a length of the first time window, a last timestamp within the first time window at which a log message corresponding to the first message value was received, and a mean inter-arrival time of log messages corresponding to the first message value.

5. The system of claim 1, comprising a memory to store a dictionary containing a plurality of message values, the plurality of message values comprising the first message value, wherein, to count the number of log messages received from which the first message value is obtained, the instructions are executable on the processor to:
compare the message value obtained from each log message value with the message values in the dictionary; and
increment a count associated with the first message value in the dictionary in response to the message value obtained matching the first message value.

6. The system of claim 5, wherein, in response to a respective message value obtained from a given log message mismatching with each message value in the dictionary, the instructions are executable on the processor to:
transmit the given log message to the backend device;
add the respective message value obtained from the given log message to the dictionary; and
set a count associated with the added respective message value to one.

7. The system of claim 5, wherein, in response to the expiry of the first time window, the instructions are executable on the processor to:
evict the first message value from the dictionary; or
reset the count associated with the first message value.

8. The system of claim 1, wherein the instructions are executable on the processor to:
increase the length of the second time window to increase deduplication of log messages received in the second time window.

9. The system of claim 1, further comprising a memory to store a dictionary containing the distinct message values, wherein the instructions are executable on the processor to:
compare a message value from a second log message to the distinct message values in the dictionary;
in response to the message value from the second log message matching the first message value in the dictionary, determine to not transmit the second log message to the backend device to apply deduplication of log messages.

10. The system of claim 1, wherein the instructions are executable on the processor to:
determine a rate of the plurality of log messages received in the first time window; and
determine the length of the second time window further based on the rate.

11. The system of claim 10, wherein the instructions are executable on the processor to:
compute a factor based on the rate, wherein the factor indicates that a rate of incoming log messages is increasing with time; and
increase the length of the second time window based on the factor.

12. A non-transitory computer-readable medium comprising instructions, the instructions being executable by a processing resource to:
receive a plurality of log messages in a first time window;
obtain a message value from each log message of the plurality of log messages;
count a number of log messages of the plurality of log messages received in the first time window from which a first message value is obtained;
transmit the counted number and a single log message from which the first message value is obtained to a backend device; and
determine a length of a second time window in which a subsequent counting of log messages is to be performed based on a rate at which log messages were received in the first time window and a rate at which log messages were received in a prior time window prior to the first time window.

13. The non-transitory computer-readable medium of claim 12, wherein, to determine the length of the second time window, the instructions are executable by the processing resource to:
compute a ratio of the rate at which log messages were received in the first time window to the rate at which log messages were received in the prior time window; and
determine the length of the second time window based on a product of the ratio and a length of the first time window.

14. The non-transitory computer-readable medium of claim 12, wherein the instructions are executable by the processing resource to determine the length of the second time window further based on a number of distinct message values obtained from the plurality of log messages received in the first time window.

15. The non-transitory computer-readable medium of claim 12, wherein the instructions are executable by the processing resource to:
transmit, in response to expiration of the first time window, metrics indicating a temporal distribution of incoming log messages corresponding to the first message value in the first time window, the metrics comprising a length of the first time window, a last timestamp within the first time window at which a log message corresponding to the first message value was received, and a mean inter-arrival time of log messages corresponding to the first message value.

16. The non-transitory computer-readable medium of claim 12, wherein the instructions are executable by the processing resource to:
adjusting the length of the second time window to change an amount of deduplication of log messages in the second time window.

17. A method performed by a system comprising a hardware processor, comprising:
receiving, at the system, a plurality of log messages in a first time window;
obtaining a message value from each log message of the plurality of log messages;
counting a number of log messages of the plurality of log messages received in the first time window from which a first message value is obtained;
transmitting, from the system to a backend device, the counted number and a first log message from which the first message value is obtained; and
determining a length of a second time window in which a subsequent counting of log messages is to be performed, the determination of the length of the second time window based on a number of the plurality of log messages received in the first time window and a number of distinct message values obtained from the plurality of log messages in the first time window.

18. The method of claim 17, further comprising:
storing, in a memory, a dictionary containing the distinct message values;
comparing a message value from a second log message to the distinct message values in the dictionary;
in response to the message value from the second log message matching the first message value in the dictionary, determining to not transmit the second log message to the backend device to apply deduplication of log messages.

19. The method of claim 17, further comprising:
determining a rate of the plurality of log messages received in the first time window;
and determining the length of the second time window further based on the rate.

20. The method of claim 19, further comprising:
computing a factor based on the rate, wherein the factor indicates that a rate of incoming log messages is increasing with time; and
increasing the length of the second time window based on the factor.

* * * * *